US008533580B1

(12) United States Patent
Xu

(10) Patent No.: US 8,533,580 B1
(45) Date of Patent: Sep. 10, 2013

(54) SYSTEM AND METHOD OF NAVIGATING LINKED WEB RESOURCES

(75) Inventor: Yongyong Xu, Sunnyvale, CA (US)

(73) Assignee: Yongyong Xu, Sunnyvale, CA (US)

( * ) Notice: Subject to any disclaimer, the term of this patent is extended or adjusted under 35 U.S.C. 154(b) by 1245 days.

(21) Appl. No.: 11/520,342

(22) Filed: Sep. 12, 2006

Related U.S. Application Data

(60) Provisional application No. 60/596,251, filed on Sep. 12, 2005.

(51) Int. Cl.
G06F 17/00 (2006.01)
G06F 17/26 (2006.01)
G06F 17/27 (2006.01)
G06F 17/28 (2006.01)
G06F 17/20 (2006.01)
G06F 17/21 (2006.01)
G06F 17/22 (2006.01)
G06F 17/24 (2006.01)
G06F 17/25 (2006.01)

(52) U.S. Cl.
USPC ........... 715/205; 715/206; 715/207; 715/208; 715/271

(58) Field of Classification Search
USPC ................... 715/205, 206, 207, 208, 271
See application file for complete search history.

(56) References Cited

U.S. PATENT DOCUMENTS

| | | | | |
|---|---|---|---|---|
| 6,237,006 B1 * | 5/2001 | Weinberg et al. | ............. | 707/797 |
| 6,256,648 B1 * | 7/2001 | Hill et al. | ........................ | 715/234 |
| 6,330,596 B1 * | 12/2001 | Stuckman et al. | ............ | 709/219 |
| 6,584,498 B2 * | 6/2003 | Nguyen | ......................... | 709/219 |
| 6,604,103 B1 * | 8/2003 | Wolfe | .................................. | 1/1 |
| 6,924,822 B2 * | 8/2005 | Card et al. | .................... | 345/660 |
| 7,490,288 B2 * | 2/2009 | Undasan | ....................... | 715/201 |
| 7,916,157 B1 * | 3/2011 | Kelley et al. | .................... | 345/660 |
| 2002/0052890 A1 * | 5/2002 | Ingram et al. | ............... | 707/500.1 |
| 2002/0129114 A1 * | 9/2002 | Sundaresan et al. | .......... | 709/213 |
| 2003/0080990 A1 * | 5/2003 | Lyness | ........................... | 345/713 |
| 2004/0205514 A1 * | 10/2004 | Sommerer et al. | .......... | 715/501.1 |
| 2006/0143568 A1 * | 6/2006 | Milener et al. | ................. | 715/738 |
| 2006/0156228 A1 * | 7/2006 | Gallo et al. | ..................... | 715/523 |
| 2006/0187240 A1 * | 8/2006 | Araki et al. | .................... | 345/660 |
| 2007/0234206 A1 * | 10/2007 | Yamabuchi et al. | ........... | 715/526 |
| 2007/0300151 A1 * | 12/2007 | Araki et al. | ..................... | 715/523 |

* cited by examiner

*Primary Examiner* — Kyle Stork
*Assistant Examiner* — Nicholas Hasty

(57) ABSTRACT

A system and method of navigating linked web resources is disclosed. The method includes the steps of displaying a current page including links to linked resources, zooming to a selected link, displaying a portion of a content of the linked resource in the same space as the link when a first predetermined zoom threshold is reached, and displaying the content of the linked resource when a second predetermined zoom threshold is reached. The system includes a navigation tool, a means for detecting movement of the navigation tool relative to a link in a web resource, and a rendering utility coupled to the means for detecting movement for providing a content of the linked web resource.

20 Claims, 14 Drawing Sheets

(Prior Arts)

SYSTEM AND METHOD OF NAVIGATING LINKED WEB RESOURCES

CROSS REFERENCE TO RELATED APPLICATIONS

The present invention claims priority from Provisional Application Ser. No. 60/596,251, filed on Sep. 12, 2005 entitled "Methods of browsing Internet in virtual 3D space with interactive game or continuous zoom in", the entire disclosure of which is herein incorporated by reference.

BACKGROUND OF THE INVENTION

The present invention relates generally to Internet navigation schemes and more particularly to an Internet navigation system and method that models cyberspace as a virtual 3D space allowing for intuitive navigation and zooming navigation.

With the fast development of the Internet, more and more people are web surfing. The Internet has become another type of media in additional to traditional newspapers, radio and TV. Most of the time, users use specialized tools such as web browsers to browse the Internet. Currently the most popular web browsers are: Netscape, Internet Explorer, and Firefox. However, web browsers aren't the only tool that can be used to navigate the Internet. Any program that can communicate with a web server through the HTTP protocol and can understand HTML pages can be used to browse the Internet. These include text-based programs such as lynx and many other customized browsers or applications like the AOL package.

The main purpose of the web browser is to connect to a listening port of a web server (default value is 80) and send an HTTP request such as a GET command for a particular web page. Once the web server receives the request, it parses the request, searches the local data store in the server, and returns the matched data, normally in the html format. The web browser interprets the returned web page in html format and then renders it into a human readable format and presents to the end user. If there are other links inside the html page that are also needed to render the page, for example, images or audio and video clips, the browser will send other requests to retrieve these data before rendering the page.

In addition to html pages, modern web browsers are capable of rendering data in other formats, such as xml data, text, jpg and many other common data types. In addition, by means of a browser plug-in or extension, web browsers can even understand and display more data types after release and installation such as VRML or even some 3D graphical languages.

Normally, to use a web browser, users need to first enter the address of a web page; the URL in the address bar of the web browser. Then after that particular web page has being displayed, the browser will display the html pages in a main window and display hypertext link inside html pages in a different highlighted color or font. Users use a mouse or keyboard to scroll up and down the web page while reading and use the mouse to click on the highlighted links to browse another page from the current page. The user can always click the BACK icon in the browser to return back to a previous link and a FORWARD arrow button to revisit a link he/she has just viewed. Of course a HOME icon is always available to jump to the user's start page, which is customizable.

However, almost all current web browsers display web pages in a 2 dimensional window which cannot be directly associated with the real world and, as such, is not realistic for viewers.

U.S. Pat. No. 6,664,980 to Bryan, Douglas L. et al. discloses a visual navigation utilizing web technology. A display navigation system is presented in which indicia for a first target category and a second target category are presented to a user on a display, where the indicia are associated with keywords and the keywords are assigned weight. The user then performs various interactions and the user's interactions are detected. Additional indicia are presented to the user in response to the interactions, where the additional indicia represent additional target categories that are similar or dissimilar to the first and second target categories depending on the interactions and weight of the keywords. Finally, additional indicia are displayed.

This patent is not related to web browsing technology.

U.S. Pat. No. 6,604,103 to Wolfe, Mark A. discloses a system and method for information retrieval employing a preloading procedure. During the time the user spends viewing the displayed information, other information that the user is likely to read or study later is preloaded into memory. If the user later requests the preloaded information, it can be written to the display very quickly. As a result, the user's request to view new information can be serviced quickly.

This patent discloses a document retrieval system having improved response time by caching a series of documents first.

U.S. Pat. No. 6,731,314 to Cheng; Gavin, et al. discloses a network-based three-dimensional multiple-user shared environment apparatus and method. A client computer program provides instructions for a processor to locate and retrieve rich media and HTML files for running in a three-dimensional graphical user interface. The program provides instructions for the processor to generate a three-dimensional (3D) graphical user interface on a display. Then, the processor generates a metaphorical user object for navigating and interacting in the three dimensions within the environment via navigational and interactive inputs, respectively, from a user. The processor also integrates an HTML object into the environment, and interacts the user object with the HTML object in response to an interactive input from the user. Preferably, the processor generates one or more additional user objects for additional users. Each of the additional user objects can also interact with the HTML object, the first user object and/or each other within the environment in response to interactive inputs from the additional users. In addition, the first user object may interact with any or all of the additional user objects in response to interactive inputs from the first user. The interactive inputs may be proxy expressions from one user to another.

This patent discloses a 3D graphical user interface but it does not discuss how to browse the web space in general.

U.S. Pat. No. 6,931,604 to Lane, Derek Graham discloses a method of navigating a collection of interconnected nodes. A method and apparatus for organizing and processing interconnected pieces of information ("nodes") using a digital computer is disclosed. Each node has elements that may be text, images, audio, video, and other computer programs. A graph-based user interface presents the individual nodes in spatial arrangements that reflect the relationships among the nodes. User interaction indicating interest in a particular node results in an increase in the "activation" of that node. This leads to an increase in the size of the presentation of that node, as well as an increase in the size of the presentation of closely related nodes. The result is a unique user interaction paradigm that allows for intuitive traversal of complex collections of nodes.

This patent discloses a method for displaying general graphs and nodes.

U.S. Pat. No. 6,724,407 to Cheng, Gavin discloses a method and system for displaying conventional hypermedia files in a 3D viewing environment. A method and a software program running on a server computer coupled to a network, such as the internet, includes a three-dimensional (3D) viewing environment generating module. When a resource locator identifying a requested hypermedia resource, probably input by a pc user logged onto the network, is received from the network by a server computer, the 3D viewing environment generating module generates a 3D viewing environment corresponding to and preferably including the requested hypermedia resource. The 3D viewing environment is sent over the network to the user's pc enabling the user to view the requested hypermedia resource in an overlay 3D viewing environment, probably already running on the user's pc. A software program also provides instructions for a computer running a 3D browser to provide a viewing environment in a 3D space having one or more displays including a conventional hypermedia resource identifiable by a conventional resource locator. One or more additional displays may also be provided in the same viewing environment, wherein the additional displays each show an auxiliary hypermedia resource fetched from the network. A request may be generated for the 3D viewing environment displaying the conventional hypermedia resource when it is determined that the resource is not pre-designed for viewing with the 3D browser. In this case, the conventional hypermedia resource is fetched from the network and displayed within the 3D viewing environment. The auxiliary hypermedia resources may be commercial advertisements that can be viewed simultaneously with the conventional hypermedia source in the same 3D viewing environment.

This patent discloses providing the 3D viewing environment for the hypermedia resource but does not cover how to browse entire Internet web sites and pages.

U.S. Pat. No. 6,636,246 to Gallo, Anthony Carmen, et al. discloses a three dimensional spatial user interface. A method and system provides a three dimensional spatial user interface (SUI) to a user of a computing device. The SUI may be manipulated in three dimensions and contains a plurality of portals. A portal may contain a sensory cue that provides a reminder as to the content of the portal. Upon selection of a portal, an application program associated with the cue in the portal is invoked. Portals may also contain further instances of the SUI of the present invention, thus providing hierarchical depth. In the preferred embodiment, the SUI is implemented as a sphere and may be viewed from an external or internal perspective.

This patent discloses a user interface that is displayed in three dimensions to display a plurality of sensory cues.

U.S. Pat. No. 6,636,210 to Cheng, Gavin discloses a method and system for auto-navigation in a three dimensional viewing environment. The method, in one embodiment, includes receiving a jump request from one viewing point to another. The method also includes determining a destination from the current viewing point with respect to the jump request. The method further includes calculating a trajectory to the destination from the current viewing point. The method stills includes displaying a set of views in animation form along the trajectory and displaying a view corresponding to the destination.

This patent discloses determining and calculating a trajectory among viewing points.

U.S. Pat. No. 6,772,139 to Smith, III, Julius O. discloses a method and apparatus for facilitating use of hypertext links on the world wide web. A database server contains pointers to useful information, such as on the World Wide Web. Users of the server may have hypertext links added automatically into documents they submit. Users may additionally contribute to the link database, thereby extending it, and may add additional qualifying information pertaining to the links.

This patent discloses automating the linking of documents on the World Wide Web by authors of Web content.

U.S. Pat. No. 6,675,212 to Greenwood, Jon Michel discloses a method and apparatus for efficient data browsing. A method and apparatus for providing improved efficiency in data browsing is disclosed. Automatic continuation of a data browsing session is enabled, while a download of a requested data file, that has been temporarily delayed, is handled separately in a background process. This separate background process generates additional requests for the requested data file as needed, thereby overcoming delays caused by transient network traffic and also enabling automatic downloading of data files that are undeliverable when first requested. When the download of the requested data file is successfully completed, a notification is provided and the requested data file is made observable.

This patent discloses using separate background processes for downloading a piece of file information.

U.S. Pat. No. 6,570,563 to Honda, Yasuaki discloses a method and system for three-dimensional virtual reality space sharing and for information transmission. When an object is moved on a client terminal, a message indicating the movement of the object is transmitted to a server terminal. The server terminal transmits the message to other client terminals. Each of the client terminals stores a message table in advance to execute the message. According the message table, an image for locally moving a particular object, for example, is generated and displayed. This novel setup transmits information about the update of an updated object composed of a plurality of sub objects each of whose state is subject to change, in a minimum transmission volume. This, in turn, allows cooperative operations of the plurality of sub objects to be smoothly displayed in a three-dimensional virtual reality space shared by a plurality of users.

U.S. Pat. No. 6,362,817 to Powers, Michael, et al. discloses a system for creating and viewing 3D environments using symbolic descriptors. A computer-based system for designing and using three-dimensional environments over a bandwidth limited network such as the Internet is disclosed. The system allows an environment to be specified as a series of two-dimensional grids of text characters. Each character occupies a single grid position and represents an object in the environment. Objects can be given characteristics such as texture maps, and associated images and sounds that are triggered by events such as a user approaching the object. An object or image can be a hyperlink so that, when clicked or moved upon, the user is transported to a new location. A basic set of objects and media (images and sounds) is provided so that a designer of an environment does not have to perform low-level three-dimensional modeling. Objects can behave differently when placed near one another. For example, walls fuse together to provide a longer wall. Ramps weld together to provide a single, longer, ramp having a slope that is shallower than the two or more ramps welded together. The environments are customizable by referring to block objects, texture maps, bitmap images, sound files, etc., that can be located anywhere on the Internet, including the user's computer. The system adapts to display differing levels of detail dependent on the performance ability of the user's computer platform.

These patents are focused on technology to reduce transmission volume in 3D virtual reality space.

U.S. Pat. No. 6,237,006 to Weinberg, Amir, et al. discloses methods for graphically representing web sites and hierarchical node structures. A visual Web site analysis program, implemented as a collection of software components, provides a variety of features for facilitating the analysis and management of web sites and Web site content. A mapping component scans a Web site over a network connection and builds a site map which graphically depicts the URLs and links of the site. Site maps are generated using a unique layout and display methodology which allows the user to visualize the overall architecture of the Web site. Various map navigation and URL filtering features are provided to facilitate the task of identifying and repairing common Web site problems, such as links to missing URLs. A dynamic page scan feature enables the user to include dynamically-generated Web pages within the site map by capturing the output of a standard Web browser when a form is submitted by the user, and then automatically resubmitting this output during subsequent mappings of the site. The Web site analysis program is implemented using an extensible architecture which includes an API that allows plug-in applications to manipulate the display of the site map. Various plug-ins are provided which utilize the API to extend the functionality of the analysis program, including an action tracking plug-in which detects user activity and behavioral data (link activity levels, common site entry and exit points, etc.) from server log files and then superimposes such data onto the site map.

This patent discloses analyzing the internal topology of web pages in a web site.

U.S. Pat. No. 5,889,951 to Lombardi, Julian discloses systems, methods, and a computer program products for accessing, leasing, relocating, constructing and modifying internet sites within a multi-dimensional virtual reality environment. The disclosed invention facilitates viewing, organizing, and optimizing Internet sites. A multi-dimensional virtual environment includes one or more respective virtual sites for each Internet site. Users are given the ability to explore the virtual environment and access Internet site data and services via respective virtual site(s). Transfer of data related to an Internet and virtual site includes assigning a transfer priority to each virtual site based on the user's location within the virtual environment, and transferring data based on the assigned priority. Users are provided with the ability to lease portions of the virtual environment, to create and modify the appearance and functionality of virtual sites on leased portions, to assign Internet site data and services to virtual sites, and to relocate virtual sites within the virtual environment.

This patent discloses providing users of the Internet with the ability to see Internet sites before selecting to use their services, thereby eliminating the need for HTML/VRML links and knowledge of Internet site URLs. It does not disclose organizing the Internet web sites and the web pages in an organizational way.

U.S. Pat. No. 6,184,867 to Kandogan, Eser, et al. discloses an input for three dimensional navigation using two joysticks. A two-joystick interface for use with an information processing system having a 3D virtual reality module implements a bulldozer control metaphor permitting movement in three orthogonal directions—forward-backward, up-down, left-right—and turning about a vertical axis. The pointing interface includes mode switching permitting use of the joysticks for the cursor positioning and page scrolling functions of the information processing system. The pointing system includes a frame-of-reference conversion module for transforming the pointing devices software interface to a four-degree-of-freedom three-dimensional interface, an interface with a virtual reality module including a display function. Ergonomic embodiments of the interface include locating the joysticks, e.g., two IBM TrackPoints along the bottom row of keys of a standard keyboard, and, alternatively, placing the joysticks and related momentary switches in a wristpad.

This patent discloses input devices for 3D navigation.

United States Patent Application 20030197737 to Kim, Jong Min discloses a 2D/3D web browsing system. The disclosed invention is directed to a 2D/3D web browser for displaying both 2D and 3D information in a window. A web browser for browsing web sites providing two-dimensional (2D) or three dimensional (3D) information is disclosed. The 2D/3D web browser of the present invention comprises a software for accessing a web site and requesting information; and a display for displaying information provided by the web site responding to the request on a display screen having a 2D/3D switchable window and a 3D-only window; wherein, if the information is 3D contents, it is displayed on a combined area of the 2D/3D switchable window and the 3D-only window, and, if the information is 2D contents, it is displayed on the 2D/3D switchable window.

This patent discloses allowing a browser to either display 3D or 2D contents based on server capability.

U.S. Pat. No. 6,924,822 to Card, Stuart Kent, et al. discloses magnification methods, systems, and computer program products for virtual three-dimensional books. A system is described for displaying images of a virtual three-dimensional book having one or more virtual pages. The system comprises a display system capable of executing a display program wherein images of the virtual three-dimensional book are produced on the display system. The display system may include a magnification function producing a virtual magnifier moveable over the virtual pages. The display system may also include a the "stretchy page" display method wherein one section of the page is directly magnified, while other adjacent sections may be directly magnified in a horizontal or vertical direction, but not both directions. Moreover, a virtual page may also be tilted about a central axis of the virtual page to accommodate viewing of a desired section on the display system. Finally, a computer program product comprising a computer usable medium having computer readable code embodied therein for producing images of a virtual three-dimensional book is also disclosed.

This patent discloses a magnification method to display 3D books.

United States Patent Application Publication No. 2004/0207641 to Palm, Charles S. et al. discloses a 3D stereo browser for the internet. A viewer for viewing stereo images either downloaded over a network, such as the Internet, or resident on a personal computer uses a graphical user interface (GUI) to facilitate the display of wireframes with or without texture applied in a variety of formats. In stereo mode, the GUI permits adjustment of the neutral plane and of camera offset. The file sizes utilized with the viewer are very small and permit rapid transmission over a network. The files contain wireframe information, texture map information and animation information.

This patent application relates to a method of displaying stereo images.

Patent number CN1558343 CN200410002524 entitled "Three dimensional resource browser and manager and method thereof" to ZHUGE HAI (CN) et al., relates to a 3D resource browsing manager and a method in the field of computer and network technology. The scheme of the disclosed invention defines a resource in one 3D orthogonal coordinate system, where one resource or one group of closely related resource content is displayed as one small cube with unique coordinate values in the same coordinate system to express its corresponding attribute. The manager includes a resource display member, a resource previewing member, a resource managing member and a resource locating member. The resource browsing process includes the following steps: selecting a resource type with the mouse or shift keys in the 3D resource display interface, determining a required resource, and browsing or completing other management operations. In addition, the coordinate value of some resource may be input to locate the resource in high efficiency.

This patent relates to resource managers and not to the whole Internet.

Patent number CN1556505 entitled "Virtual fractal spectacle three dimensional roaming system" by WANG YAN (CN), et al. discloses a 3D roaming system of virtual fractional scenes, including a material quality generating unit, an entity constructing unit, a VRML browser, a scene map editing unit and a virtual scene browsing unit, and its working flows including starting; initializing device; initializing scene; interactive processing: receiving the information including forward, backward, look-up, look-down, turning left and turning right, and making corresponding transformation on a 3D model and the observed state; calculating object information; pattern romancing processing; ending and otherwise returning to interactive processing recovering resources. It claims the advantages of simple structure, low cost, convenient operation, fast generating of scene environment, etc, and perfects the virtual-reality entity base, applied to the requirements of virtual battlefield training and virtual driving training.

This patent relates to a 3D roaming system and does not relate to modeling the Internet as a 3D world.

Conventional 3D browsers on the market, include 3B (http://www.3b.net/) which displays a 3D city containing lots of bulletin boards, which display the web sites of registered pages. The displayed websites are not part of a whole picture and do not cover all web sites, the display being treated as a virtual 3D shop that contains only paid web sites.

CubicEye from 2ce (http://www.2ce.com) is another 3D browser interface that allows users to see, and interact with, 6 to 625 website pages at one time. The CubicEye environment is initially presented in the form of a six-sided cube; one page is directly in front of you, one to your left and right, one on top and bottom and the last is behind you. Links on every page are active so you can navigate through the links on any or all of the panels.

Other conventional 3D browsers include activeworlds (http://www.activeworlds.com/) which allows users to chat in 3D. However, it requires users to create a virtual 3D world themselves and it also does not contain all the Internet web sites and web pages.

SUMMARY OF INVENTION

The system and method of the present invention displays the entire Internet and associated web sites and web pages in a virtual 3D world (which includes the real world) and maps the Internet world to the 3D virtual world to thereby provide viewers more enjoyment during web surfing. The system and method further provides viewers with a feeling like they are playing games in the virtual 3D world. Furthermore, different people who browse the Internet can interact with each other in this world.

In accordance with one aspect of the invention, a system includes a navigation tool, a means for detecting movement of the navigation tool relative to a link in a web resource, and a rendering utility coupled to the means for detecting movement for providing a content of the linked web resource.

In accordance with another aspect of the invention, a method includes the steps of displaying a current page including links to linked resources, zooming to a selected link, displaying a portion of a content of the linked resource in the same space as the link when a first predetermined zoom threshold is reached, and displaying the content of the linked resource when a second predetermined zoom threshold is reached.

In accordance with yet another aspect of the invention, a method of navigating linked web resources without requiring clicking links includes the steps of displaying a current web resource in a top layer, detecting a zooming action on a link in the current web resource, rendering the linked web resource in an underlying layer when a predetermined threshold is reached, and allowing navigation to other linked web resources in the underlying layer.

BRIEF DESCRIPTION OF THE DRAWINGS

The present disclosure may be better understood and its numerous features and advantages made apparent to those skilled in the art by referencing the accompanying drawings wherein.

DETAILED DESCRIPTION

The system in accordance with the invention represents the entire Internet as a virtual space called Internet space that is similar to a virtual game world. The virtual space may be 2D or 3D. For illustration purposes, the virtual space will be described as a 3D virtual space. Web resources including top level domains, domain names, web sites, and web pages can be represented in this space, and the browser acts as a browsing device in this space that can be controlled by the user to browse the 3D virtual space. A user can either use a mouse, a keyboard or a game controller to control the browser to navigate to each web site and browse web pages. In this system, the home page web site is the first place positioned and the home page is the first web page visible to the user when the browser is opened.

The system in accordance with the invention may give the user options to view a group of web sites or web pages while the user is moving the browser device over the 3D virtual space. This gives the user an overview of groups of web pages or web sites in the Internet space—instead of visiting one page a time like a traditional browser.

The Internet 3D virtual space can have multiple forms as long as it gives the user a view that is more like a virtual game world or the real world. In other words, the view could be a mapping from the real world or game world to the Internet web sites or web pages and the browser allows users to view all the web sites and web pages in this space and can navigate into this space as if it is in a virtual 3D world.

Figure 1A:
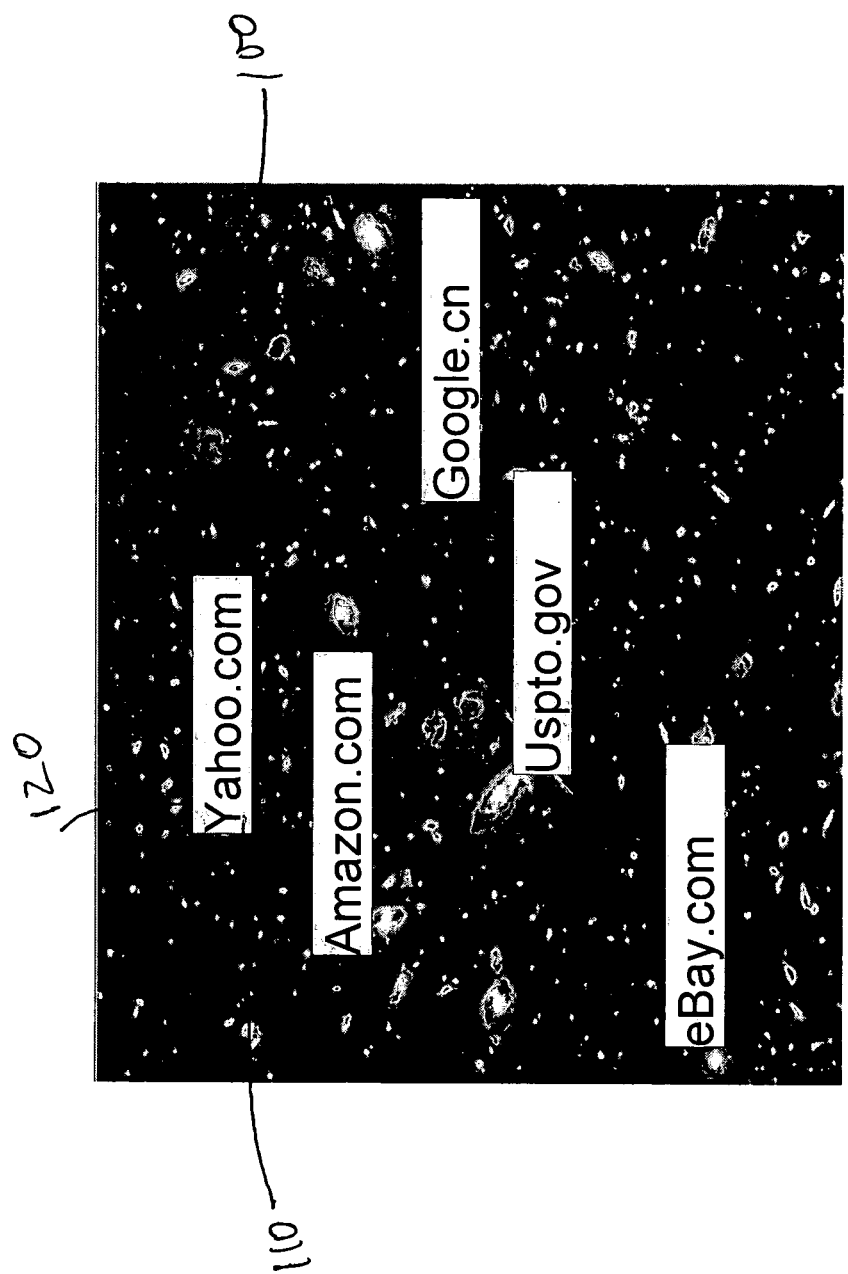
FIG. 1A is a graphical representation showing a mapping of the Internet into a virtual 3D space in accordance with the invention.
Figure 1B:
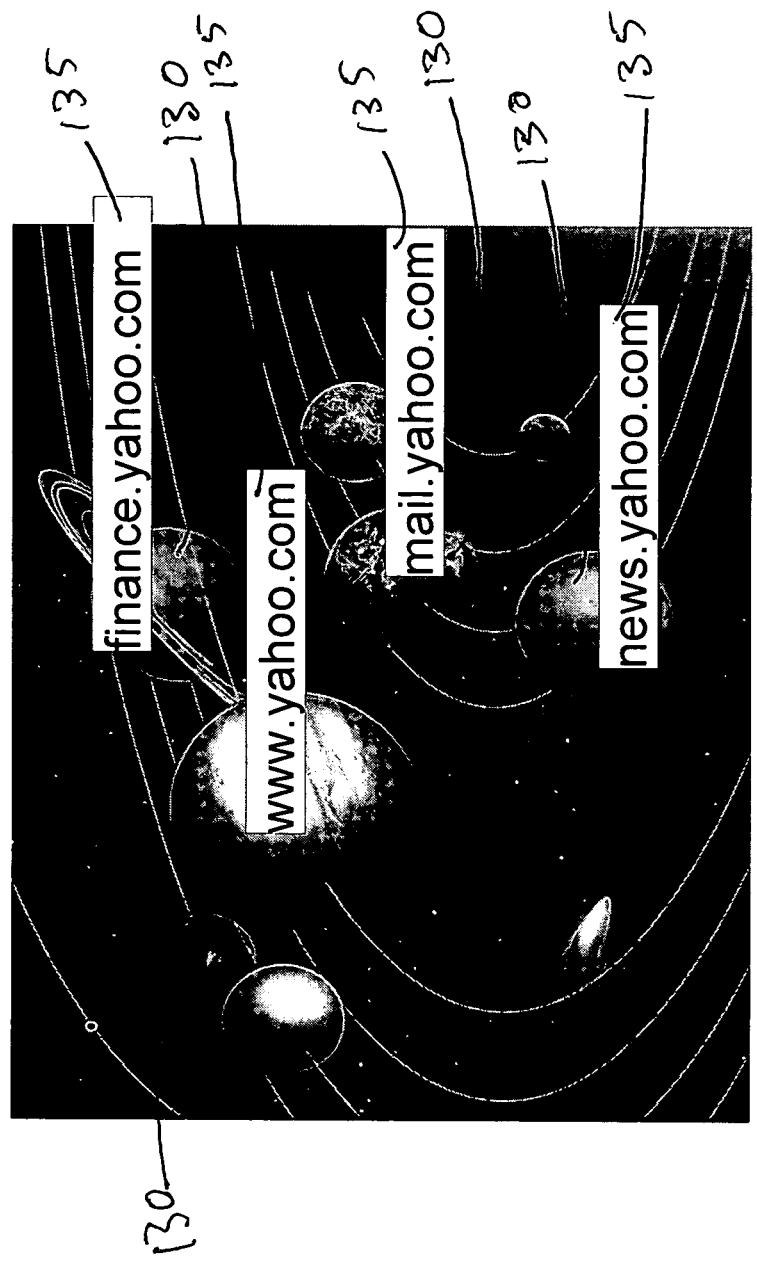
FIG. 1B is a graphical representation showing a mapping of a host domain into a sector of the virtual 3D space in accordance with the invention.
Figure 1C:
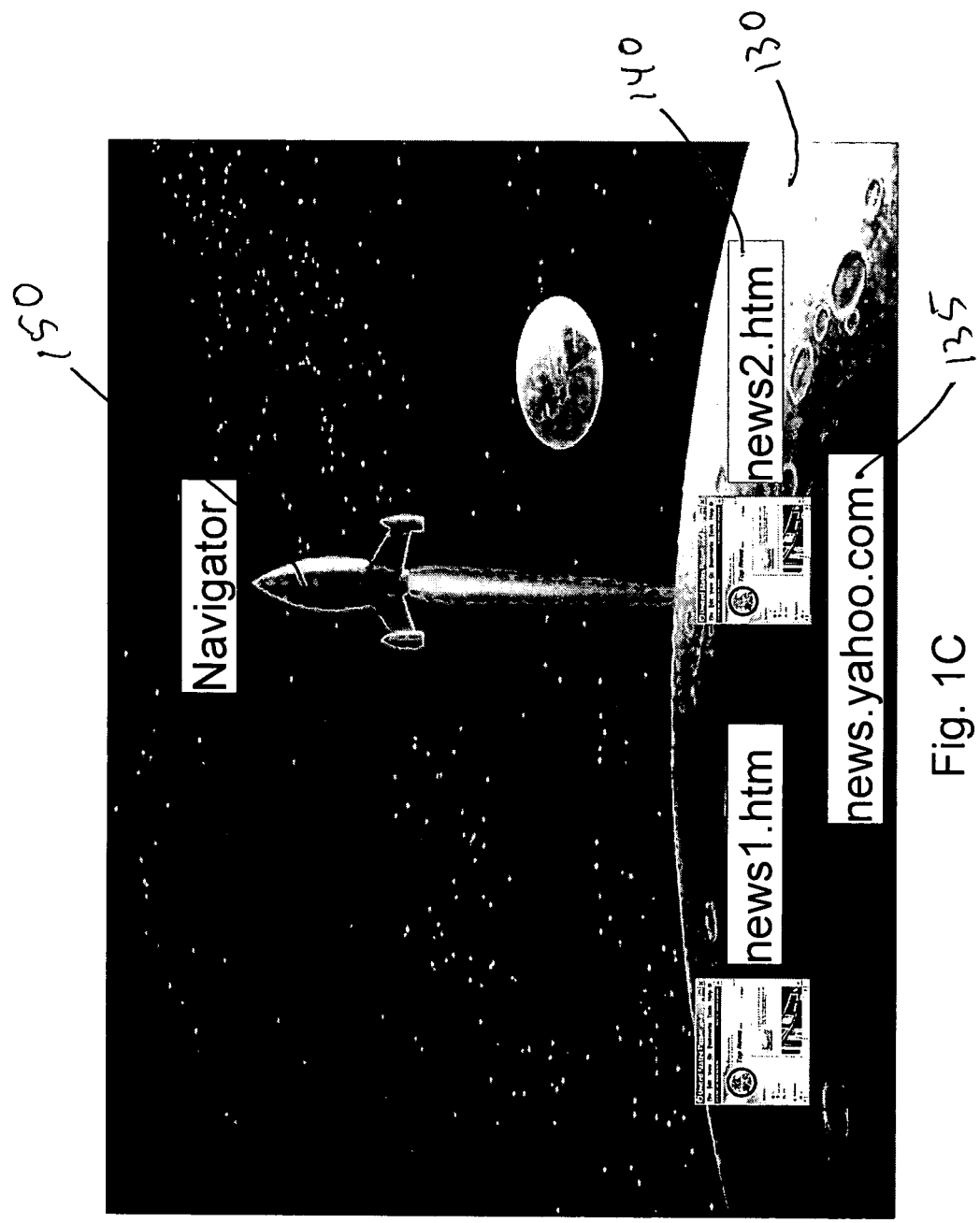
FIG. 1C is a graphical representation showing a mapping of a web page into a sector of the virtual 3D space in accordance with the invention.
Figure 1D:
FIG. 1D is a graphical representation showing a navigation tool in the 3D virtual space in accordance with the invention.

For example, in accordance with one aspect of the invention, Internet space is mapped to a 3D virtual space representation of the universe 100 as shown in FIGS. 1A-1D. All Internet sites or domains in the Internet are scatted around the universe 100 and mapped to different galaxies, stars, and planets. For example, yahoo.com domain 110 is mapped to a solar system 120 in the universe 100 (FIG. 1A). With reference to FIG. 1B, each planet 130 represents a web site or host 135 within the yahoo.com domain 110. All web pages 140 are graphically represented on the surface of each planet 130 (FIG. 1C). The user's browser is mapped to a navigational tool such as a spaceship 150 and browsing a web page 140 is like driving the spaceship 150 to visit each planet 130. A plurality of users 160 may navigate in the 3D virtual space 100 and look upon the sky in outer space and see millions of other web sites waiting for them to explore like an astronaut. Star gates 160 in the universe 100 allow users to quickly jump to another page or site. Star gates 160 may represent quick links, favorite sites, book marks and back buttons.

Figure 2:
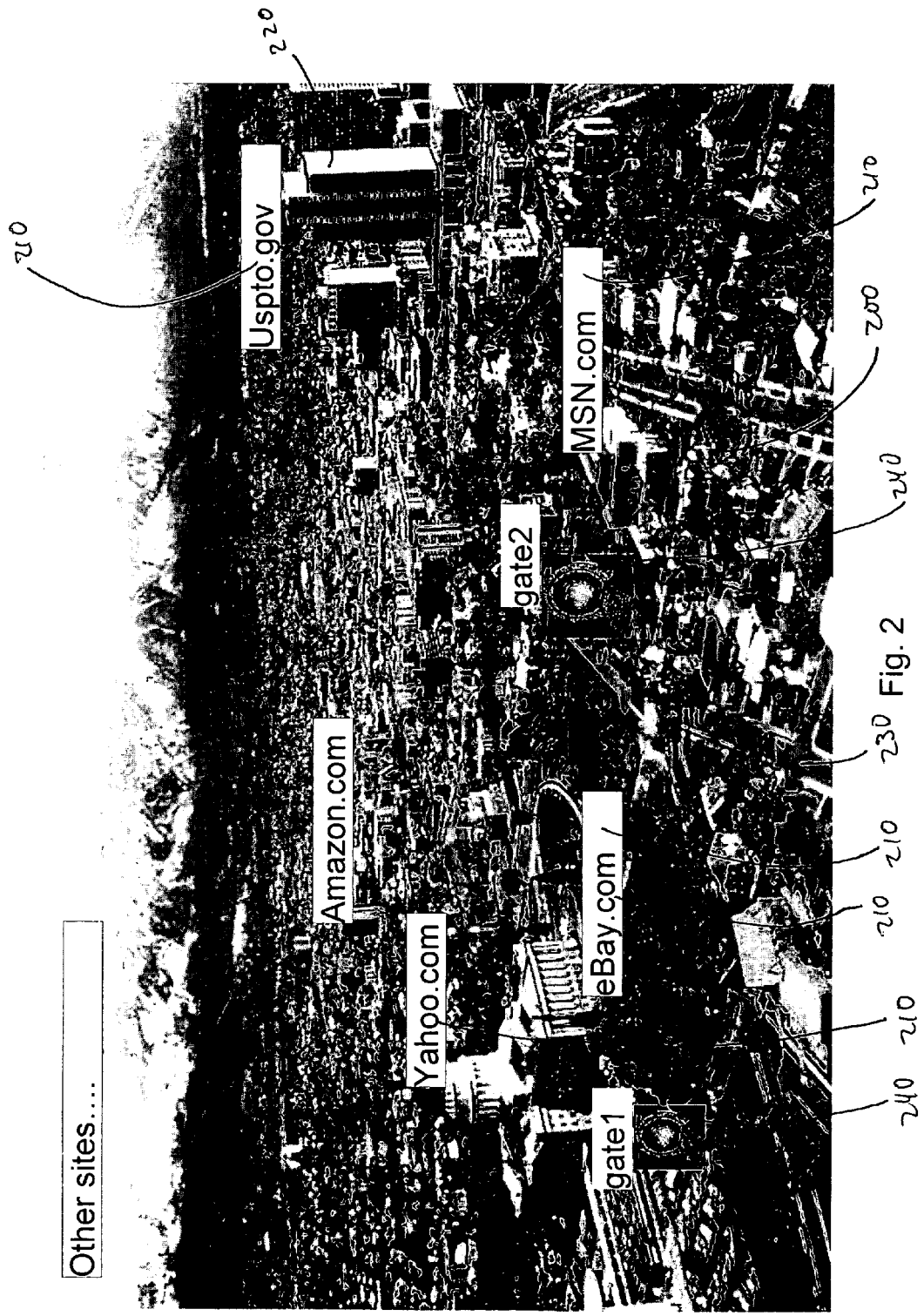
FIG. 2 is an alternative graphical representation showing a mapping of the Internet into a virtual space in accordance with the invention.

In accordance with another aspect of the invention, the Internet space is mapped to a virtual city 200 where each web site 210 is shown as a house or building 220 on a street 230, as shown in FIG. 2. The browser is like a user who drives a car or walks in the street 230. As soon as the user enters into a house or building 220, the user will see the home page inside a room and from there navigate to all the other pages within each web site. Gates 240 allow users to quickly go to particular web sites and may represent quick links, favorite sites, book marks and back buttons.

Figure 3:
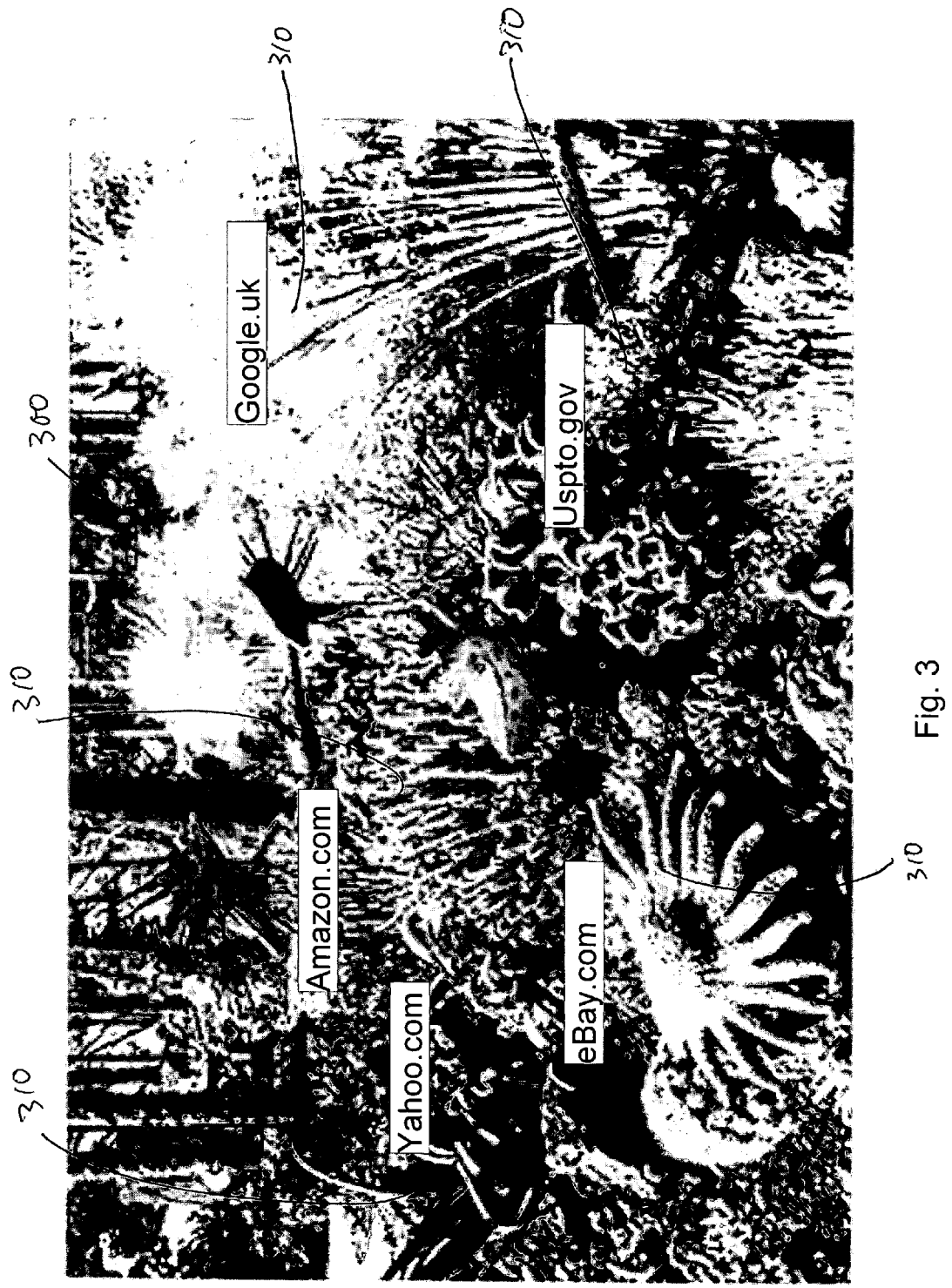
FIG. 3 is an alternative graphical representation showing a mapping of the Internet into a virtual space in accordance with the invention.

In accordance with another aspect of the invention, and with reference to FIG. 3, the Internet space is mapped into a sea world 300 with different corals 310 corresponding to different web sites. Inside each coral, the details of the web site correspond to its web pages. For example, a coral 310 may map one web site and each branch of the coral may map to each web page of the web site. The user is like a swimming fish that swims into the sea world 300 and views the different web sites and web pages all together.

In accordance with another aspect of the invention, the Internet space is mapped into the real world of the earth. For example, each web site that has a corresponding company will have the web site located in the company location in the real world map. Anybody goes directly or points to the location of the company in the map and then sees the company web site. In this example, the 3D virtual space is exactly the same as the 3D world we are living in except it provides the capability of seeing web sites and web pages. From the virtual 3D world, there might be star gates or doors that open to the world of the Internet.

There could be more views that can be created to map the Internet space into a 3D virtual space with each web site corresponding to an object in the 3D virtual space and the web pages residing in that object. A user's browser preferably acts as a movable object or window controlled by the user that is capable of navigating in the 3D virtual space and can move closer to a web site object to view the contents of the web site and read web pages on top of it. The users can even interact with the web site or web page object using the game controller such as firing to open a web page or interacting with other people who are also watching the similar web sites through methods described herein.

Due to the enormous number of web sites and web pages in the Internet space (more than millions), the Internet space can be organized to allow users to more efficiently navigate to each web site without difficulty. For example, in the 3D virtual space of the Internet, the system of the invention can divide web sites into multiple clusters. For example, one cluster may include all .edu web sites and another cluster .gov web sites and a third cluster .com web sites. Thus, by looking for the clusters where a web site belongs, the user can easily navigate to the correct web site. In addition, clusters can further be divided into multiple sub clusters according to predefined categories. This is important when there are too many sites under top clusters such as .com.

Since most web sites are based on a domain name, one way to divide web sites into clusters is to use a second level domain name in a dictionary sort order and then align them in the 3D virtual space. For example, all domain names starting with the letter "A" will be organized as one cluster and all domain names starting with the letter "B" will comprise another cluster. Under cluster A, all domain names starting with "AA" will be a sub cluster and domain names starting with "AB" will be another sub cluster. By recursively repeating this process, a user can easily position each web site cluster in the virtual Internet space. Also, in order to refer to some web site by IP address, a separate IP based cluster is also possible in the picture.

In the above views, clusters could have different names. For example, in the universe views, clusters could be galaxies or nebulas of stars. In the city or map views, clusters could be the city district or street, which contains multiple web site houses. The way to classify and position all the web sites and web pages are not limited to arranging them in alphabetical order. Any method can be utilized as long as it puts each web site into the 3D virtual space. For example, another way of organizing all the web sites in the 3D virtual space is to manually organize and display different kinds of web sites according to their corresponding categories. For example, all web sites about physics could be organized in a virtual 3D university and all arts web sites could be organized in a gallery.

The positioning of the web sites in the virtual 3D space may depend on a system configuration, user preferences or view selections. Basically there are two types of coordination that every browser can use—global or local for a view. If the users use the browser solely for themselves and they do not interact with others (as will discussed later), the browser can use whatever coordinates the browser likes. For example, the browser could define the dimension of the universe as 1 billion miles or the city size as 1 million square miles. It doesn't matter as long as it knows how to spread out web sites evenly across the Internet space. The coordination of each web site may have a position that is only meaningful to that browser. This method works when browsers are running as a standalone program in each user's private computer system. No interaction with others in this virtual space is needed.

However, if the user does want to interact with other users in the same 3D virtual space, there must be a globally defined coordination, dimension or measurement for each view. In this view, all web sites are assigned globally unique coordinates that are the same for all browsers. For instance, in the universe view the actual universe size (20 billion light years) can be used, or in the city view, the global city size can be defined as 1 million miles. By sharing the same coordinates and map, for any view, different users will always see the same web site in the same location in this global 3D virtual space and it is possible to have interactions between users.

To discover all the existing web sites of the Internet in this 3D virtual space, the positioning data can be pre-installed or a method of dynamically discovering the positioning data during usage can be used. For the first method, when the browser is installed, it carries a database which contains positions of all Internet web sites for a particular view. However, as the web sites change from time to time, it is necessary for a user to update the database periodically. It may do so by communicating to a DNS server from time to time.

This method requires a large storage space and works well for static web sites. This method may not work as well for dynamic web sites or sub domain web sites registered and maintained by thousands of individual domain servers in the Internet. It is difficult to detect, update or track these web sites under sub domains or web sites referenced by IP address, or dynamical IP addresses.

To let the program automatically discover these web sites gradually during user web surfing, an alternative method will assign a unique position to the web site that a user has just visited and all the associated web sites that current web pages have referred to. When the user navigates to more and more sites, more and more web sites will appear in the user's view. This method only caches those web sites and pages that the user have already visited or some frequently accessed web sites such as famous portals or search engines and can greatly reduce the overhead of maintaining the list of positions for all web sites in the Internet. At any time, the user could still have an overview of all the web sites that the user has already visited or navigated to.

Of course, in order to maintain a unique position in the 3D virtual space in a view for all browsers, the browser may need to implement an algorithm to generate a same unique position for all browsers. Or a central server can be used so that each individual web browser could query or update such position information for each web site through this server.

For example, when a user first visits www.yahoo.com by entering the address directly, the system will generate a new position corresponding to this web site and put them together with the top level clusters of .com and then associate it to www.yahoo.com. While the system displays the home page of www.yahoo.com, it may also refer to other web sites such as ads.yahoo.com, mail.yahoo.com or finance.yahoo.com, and the system may then generate the new corresponding positions. The system may put these related web sites under the same sub-domain physically together in the 3D virtual space so users can easily see and access them.

For example, in the universe view, all the web sites under the sub-domain yahoo.com can be put into planets into the same solar system. In a city view, all the sub-domain web sites could be put under the same plaza near the street and name it the yahoo.com plaza. Meanwhile, when the browser generates the position information and the browser is going to share or interact with other browsers in the world, it could query and update the information from a centralized server.

Once the web site position is defined in this 3D virtual space, the browsing to that web site becomes as easy as the user navigating the browser window in the 3D space to that web site in the 3D space. It could be a fun game for users to play. For example, in the universe view, a user just needs to fly his spaceship to the web site planet as if playing a 3D flying game. In the city view, one can drive a car to the street where the web site house is located. Furthermore, the browser may provide some sort of shooting device so that a user can shoot the remote web site symbol so that it can display that web site more immediately. This will greatly enhance the fun in surfing the Internet since web browsing now becomes an integral part of a virtual 3D game.

The web sites that are unexplored may not be shown or not be accessible in the 3D virtual space. When users explore more and more of the Internet space, there may be less and less dark areas in the virtual space. In order to jump directly to a web site or web page, the browser may provide a shortcut or address bar for a user to enter the addresses directly and the system may navigate to the address automatically to save time or the system may jump directly to the most frequently visited sites or a favorite site. Alternatively, a star gate in the 3D virtual space may provide similar functionality.

Users may direct the browser to retrieve and display multiple web sites in a range or according to some criteria, for example, all web sites starting with "abcdef". This kind of functionality could also be integrated with search engines or web site classifications—such as displaying all web sites that are selling particular types of products. The users may search for some web sites or web pages, and then the browser may display the searched-for web pages and web sites in a different color or theme such as with a blinking colored light on top of a house or by masking a planet with a color or other sign so people can browse them one by one.

In the 3D virtual space, web sites are represented as objects like planets or houses. The browser will display the web site objects either by a graphical 3D object or with a symbol in the location of the web site. For example, in the universe view, the browser will display a web site like a planet while in the city or map view; it will be displayed as a house. The objects can have an optional label or symbol on top of it signifying its name. Visited web sites or web pages could also be displayed in a color, font or theme that is different from regular web sites so that users will know which sites they have already visited. The size, shape, color and other attributes of the displayed object may also be associated with the size, number of pages or number of visitors of the web sites—for example, popular portals like www.yahoo.com may look like a skyscraper while other smaller ones may look like a townhouse or condo.

Furthermore, web designers may optionally create their own customized look and feel of the web site so that the browser can retrieve a display instead of a standard object; or web site designers may put advertisements or pay additional fees to the system so that their web sites have more occurrences in the 3D virtual space. Normally, a customized design may be retrieved from the meta data of the home page of a particular web site which points to a data file located in the web server. The data file contains a description of the object in 3D space in a format that is understood by the browser, such as in VRML file. Every time the browser shows the web site, it will show the rendered object instead of a standard object to give an individual look and feel for each web site.

The system may encourage web site designers to start thinking about moving into the 3D virtual space and start to build their own logo, symbol or object for their web site. For example, some companies who design a very attractive 3D object can attract more users since the users may see the attractive 3D object while navigating in the 3D virtual space.

Figure 4C:
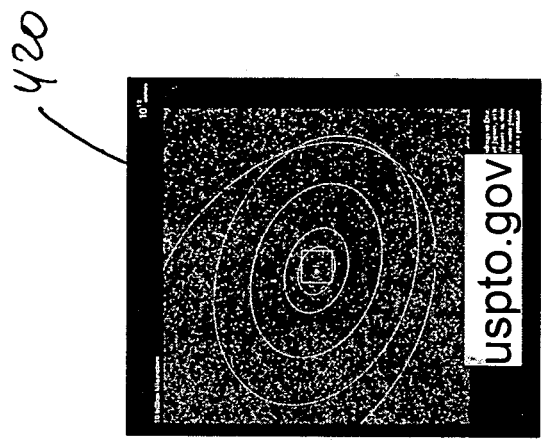
FIG. 4C is a graphical representation showing a secondary level domain in accordance with the invention.
Figure 4B:
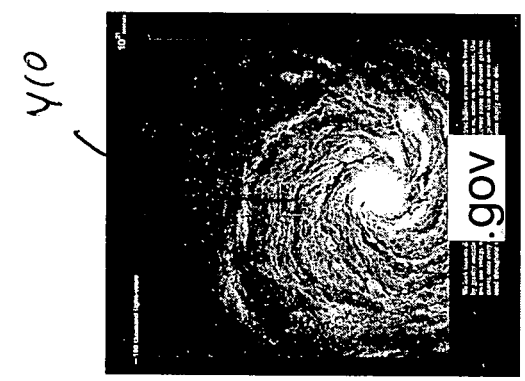
FIG. 4B is a graphical representation showing a top level domain in accordance with the invention.
Figure 4A:
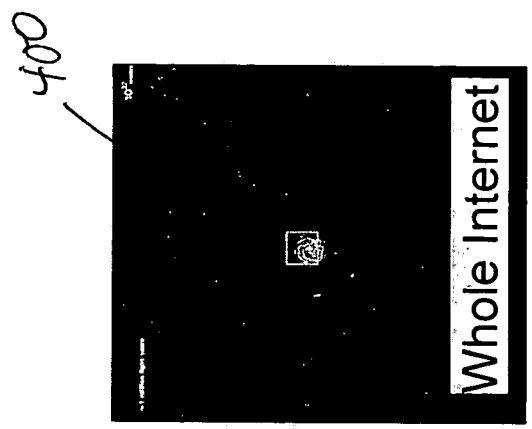
FIG. 4A is a graphical representation of the Internet in a virtual 3D space in accordance with the invention.
Figure 4F:
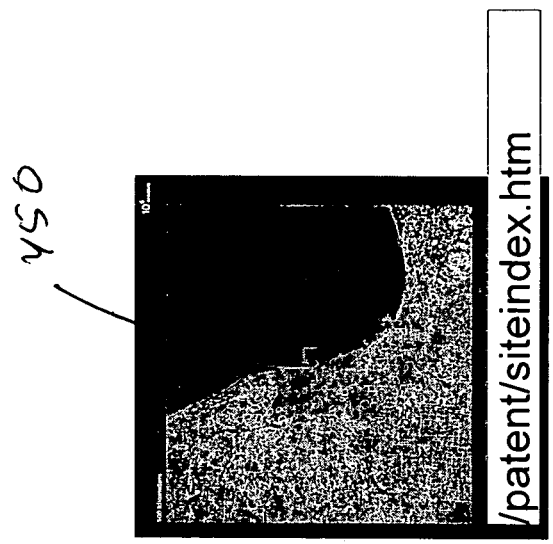
FIG. 4F is a graphical representation showing a web page of a subdirectory in accordance with the invention.
Figure 4E:
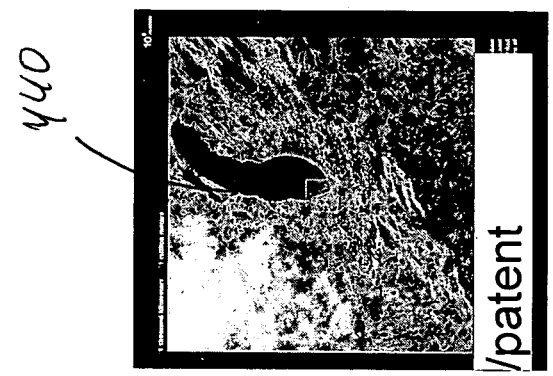
FIG. 4E is a graphical representation showing a subdirectory of the host in accordance with the invention.
Figure 4D:
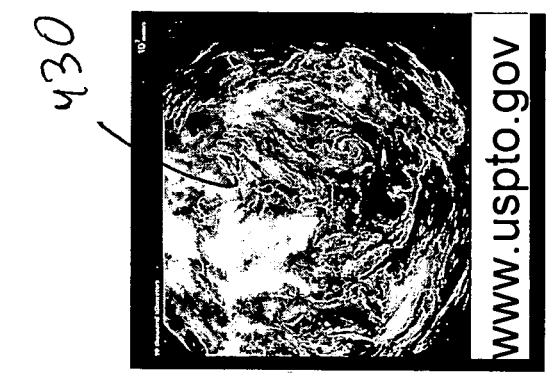
FIG. 4D is a graphical representation showing a host in accordance with the invention.
Figures 4G, 4H, 4I:
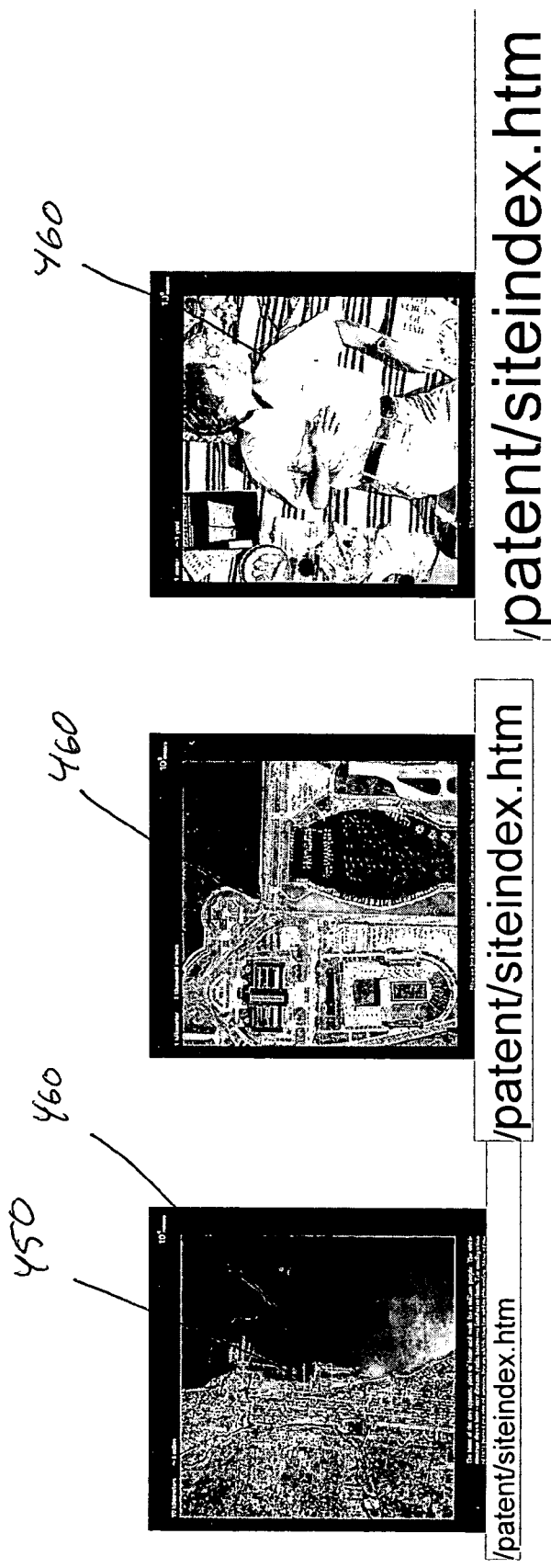
FIG. 4G-4I show graphical representations of details of the web page of FIG. 4F.

Navigating the 3D virtual space includes moving the navigation tools such as the spaceship 150 and the car toward the different objects in the 3D virtual space. With reference to FIGS. 4A-4I, the universe 400. Moving toward the galaxy 410, the user becomes aware of the top level domain .gov. Moving further within the galaxy 410 toward the solar system 420, the user sees the domain for the USTPO, uspto.gov. Movement toward the planet Earth 430, the user becomes aware of the web site www.uspto.gov. A lake 440 on the surface of the Earth 430 represents a subdirectory /patent of the web site. Moving further toward the lake 440, the user sees one of the web pages /patent/siteindex.htm 450 of the web site on a shore 450. The content 460 of the web page /patent/siteindex.htm 450 becomes increasingly visible to the user as the user moves the navigation tool closer to the shore 450 of the lake as shown in FIGS. 4G-4I, where FIGS. 4H and 4I show increasing content 460 detail.

Web pages inside web sites can also be represented as other objects that are readable or viewable. Since one web site may host many web pages, these web pages may be organized in a way that is easier for users to navigate or browse. Traditionally web pages referred to by a URL are like a tree structure rooted from the root of the web site and separated by "/" symbols. There are two approaches to display web pages inside the web site. The first approach is to display different web pages individually in the 3D virtual space so that users can view the pages one by one just like visiting a museum. The second approach is to render web pages in one virtual surface so that the user does not need to click anything to move from one page to another but can still browse all the pages.

In the first approach, each individual page will have a different representation in the 3D virtual space, typically inside the web site object. When a user visits the web site for the first time, he will only see the main page of the web site. If he is not close enough to the web page, the browser may only display a symbolic object representing that page instead of the details of the page since no detailed information has been downloaded from the web server yet. While the user gets close to the page and starts to read the page, the content of the page is retrieved automatically from the web server by the browser. After parsing, the browser may also discover more pages and then it may display other pages in other areas inside the web site object. The process of positioning the web pages is similar to the process of positioning the web sites except that individual web pages are positioned in the 3D virtual space instead of the web sites. Symbols or standard objects representing the other pages may be used to display these web pages. The actual content of the pages will not be retrieved until the user starts to navigate close enough to that page or shoot that page to trigger the download steps.

There are multiple representations of the web pages in the 3D virtual space. For example, a piece of paper, a room, a door, a gate, a window, a screen, a monitor, a drawing, a wall or anything that can be used to display a page of information. The actual selection of the object may be up to the user but it should be universal if interactions are allowed or enabled among users.

Similar to the web sites discussed above, web pages that are unknown to the browser or the users will not be shown until the users explicitly enter the URL of the web resource or the browser browses close to that page. Also similar to the case of a web site, web pages can be designed to have their own icon to be represented in the 3D virtual space in order to attract more traffic or just for fun. Users may more easily distinguish between different web pages that are composed of different icons.

For example, if the web site is composed of a house and inside the house each web page is represented as a different door, or gate, the main page would be the entrance of the house and other doors represent other pages. Different doors may use different colors, shapes or other attributes to signify the importance of each page.

All web pages inside a web site can also be organized. For example, the web pages can be listed sequentially, randomly or in a tree structure. This is also up to the browser configuration or a user's preference. There are multiple ways to organize web pages in the web site to better help users to browse between each page.

One example of organizing all pages in the web site is to show them like a tree or forest structure reflecting their URL relations where the root of the tree is associated with the main page. Each individual page linked directly under the root will cause a new branch to be created and other pages coming from the branch further down the index. In the example of yahoo.com, yahoo.com/ is the root page while yahoo.com/finance is a branch for all finance information and yahoo.com/mail is the branch for all email information. yahoo.com/finance/stock is a smaller branch from the finance branch. The whole tree is composed of the whole web site.

Another example of how to organize the web pages is to represent the web pages in hallways and rooms in the house web site. Different rooms lead to different web pages. Of course, for very complex web sites, there are lots of rooms representing the web pages. Yet another example is to show different pages as floating paper or paintings like in a museum so that the user can go and read one by one by driving the spaceship, car or browser closer.

For a user to view or read the web page, he or she has to move closer to the page so that the browser will then trigger the process of downloading that web page. From a remote location, a user will only see an icon representing the web page object. This can help to improve the performance or response time of the browser. Details will be available only when the user moves closer. Of course, if the browser has already downloaded the web page and kept it in a local cache, it can still render and display that web page from the angle of the user's location. Just in this case, the content of web pages will not be clear unless the user moves closer. When the user starts to navigate close to the page and read all the details, the browser can contact the web server again for an updated version.

However, at any time, the browser can display the already visited portion of the web pages or the total tree structure of web pages so that user can pick any one to read and access at any time. In this case, the users will be able to see multiple web pages at the same time as long as the user is viewing all of them from a distance. For example, different web pages might be displayed in different walls in the web site house and the user can easily see all of them by just making turns. Some web pages contain dynamic content that changes from time to time, and for these pages, if the browser computer system is powerful enough, the browser can choose to display animated graphics in the 3D virtual space as well. However, some computers can only display abbreviated pictures instead of full images in the 3D virtual space in order to speed up the user response time.

Typically, a web page is rendered and displayed in the same way as traditional web browsers display web pages, unless the web site provides some 3D content that can be shown as 3D content. Currently, the majority of content in a web page are html pages, thus, the browser will render them from html tags into two dimensional text and pictures that the user can understand. If a web page contains contents in 3D such as VRML, then the browser can show them directly in the 3D virtual world. Otherwise, most users will still see the contents as in a 2D canvas.

The contents in regular html pages or other documents will be rendered directly in the display canvas in the 3D virtual space, such as on the wall, a paper, or a window. If some web sites contain dynamic or interactive contents like html forms, they will be rendered in the same way. Users may be able to use the mouse to select different forms and enter new data from the keyboard, or use the mouse to select pull down menus, selection lists or to click buttons. The interaction between users with web pages are the same as in normal web browsers—the browsers collect the user input data and send the data to the web server and the web server processes the data and returns new data to be shown for that page. During these processes, the browser may use cookies to persist states or session information for the users. In accordance with the invention, the system may allow users to use other means to click buttons such as using the action button in the game controller to fire at a button in order to trigger the action. In other words, since the web page becomes an object in the 3D virtual space, users in the 3D virtual space can interact with the object in ways other than traditional mouse operations.

The actions or operations allowed in the 3D virtual space can be defined by the system and the browser and also depend on what kind of navigation device the user is using to control the movement in the 3D virtual space. For example, if a user is using a game controller to control his movement in the 3D virtual space, the user can have other means of actions or operations defined such as firing, kicking, touching, or other kinds of actions. The web page designer, could also recognized the existence of this 3D virtual space and add in their web page means to react to such actions. For example, when the user kicks on a particular portion of the web page, then the web page may display other pictures or react with some sounds. Although traditional mouse actions contain mouse moves, mouse clicks or double clicks, the actions allowed in the 3D world are much richer and can be explored by web page designers to make the web pages more fun and interactive than traditional 2D web pages. Of course, the newly added actions can co-exist with regular html pages, for example, embedded into special tags or comments lines, or even customized scripts so that traditional web browsers can still render and display the web pages.

Traditional scripts such as Javascript or VBscript can be supported in the browser so that animations or other client processing can continue to work during the display of the web page. However, more scripts commands, functions or events could be added or extended in order to support the changes within the 3D virtual space and the interactions between the user and the web page. Some browsers allow in-place display of documents that are rendered or displayed by other applications such as a Adobe Acrobat or MSWord, in this case, the browser could also use these external applications to render the documents to the 2D surface inside of the 3D virtual world. During this process, the browser may provide a mapping mechanism to transfer the original 2D window that is required by those applications into a 3D window inside the 3D virtual space. For these applications, the browser may act as a 3D displaying device and the 3D virtual space is transparent to these applications.

Links play an important role in web pages that allow users to browse to a new web page away from the current web page being viewed. In the 3D virtual space, the links can be treated as a transferring gate 240 (FIG. 2) that when triggered, will transfer the user from the current web page location to the new location where the new page is located and displayed. For example, the links could be displayed as a worm hole, a star gate 160 (FIG. 1D) or door so that the moment the user clicks on it or fires on it, then the door is opened and the user is transferred automatically to the new location. If it refers to an internal document in the same web site, the user may be still in the same planet, or house, otherwise, the user may find himself in a different planet or house. During the transferring and rendering of the new web page, the system can display animations showing the route and steps taken. In other words, the links may act as transferring gates in the 3D virtual space.

Similar to the traditional Back, Forward or Home buttons in a traditional web browser, the browser may display some special gates called back gate, forward gate or home gate for every where the user browses. To go to a previous or a next page, the user can move to that back gate or forward gate in the 3D virtual space. Of course, these buttons can also be part of the browser that users can click directly but having back, forward and home gates in the 3D virtual space can increase the fun during web surfing. Also zooming is relatively easy in this 3D virtual space; the closer users move toward the web page, the bigger the text and images. The further away, the smaller the image looks, just like in the real world.

This first approach for browsing web pages is more suitable for those who have been used to the traditional web browsing methods with traditional browsers.

In the second approach, linked web pages are rendered in one window and the user does not need to click anything to move from one linked page to another and can browse all the pages by zooming through the linked pages. This approach is not limited to displaying web pages in the 3D virtual space but can be used to display any web pages in any browser. This is a new rendering and display method for any web page that basically enables seamless mobility for users to browse multiple linked web pages. According to this method, a user continuously zooms in on an object and will see the next level of detail of the object that the user was not able to see from far away.

Using this approach, the browser can browse all linked web pages freely and be able to browse one or multiple web pages without clicking on any particular link. This approach allows users to zoom in and out of a web page just as they are looking at the web page using a microscope.

Figures 5A, 5B, 5C:
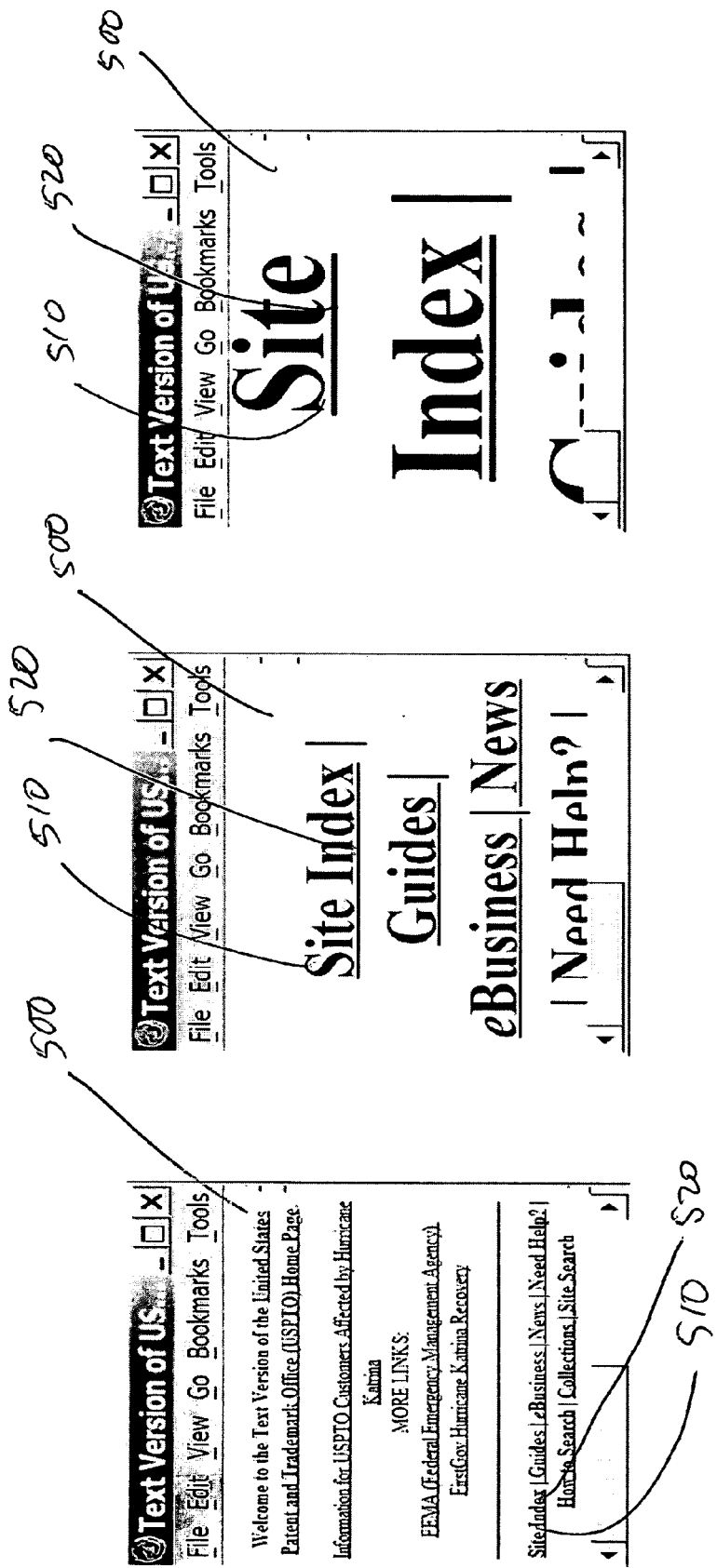
FIGS. 5A-5C show graphical representations of a prior art zooming technique.

In this approach, the user is presented with a top web page in a top layer and the top web page contains regular text or images. In addition, the top web page contains links to other pages. With reference to FIGS. 5A-5C, zooming into a prior art web page 500 shows increasing detail of the content 510 of the web page 500. To move to a linked page, the user must click a link 520 in the web page 500.

Figure 6B:
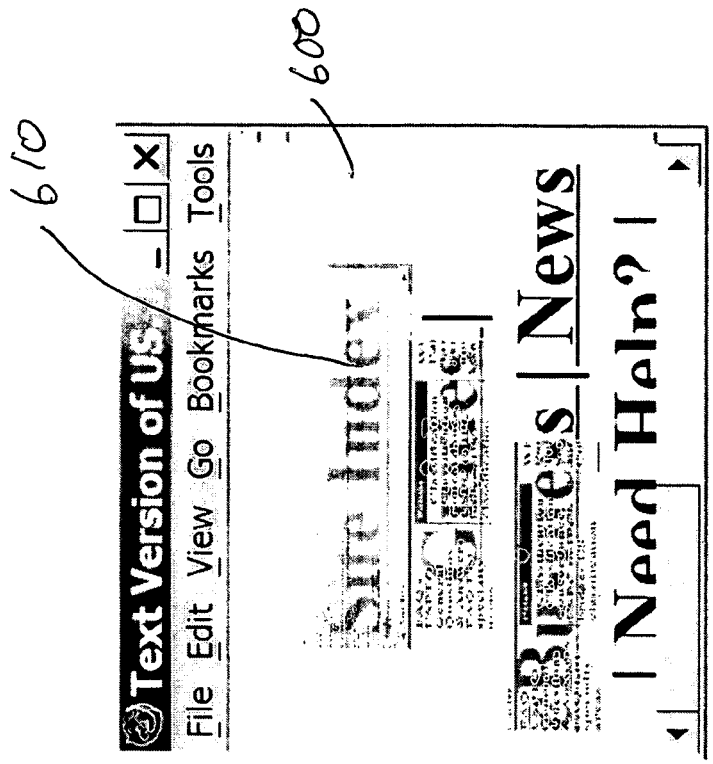
FIGS. 6A-6F show graphical representations of a zooming technique in accordance with the invention.
Figure 6A:
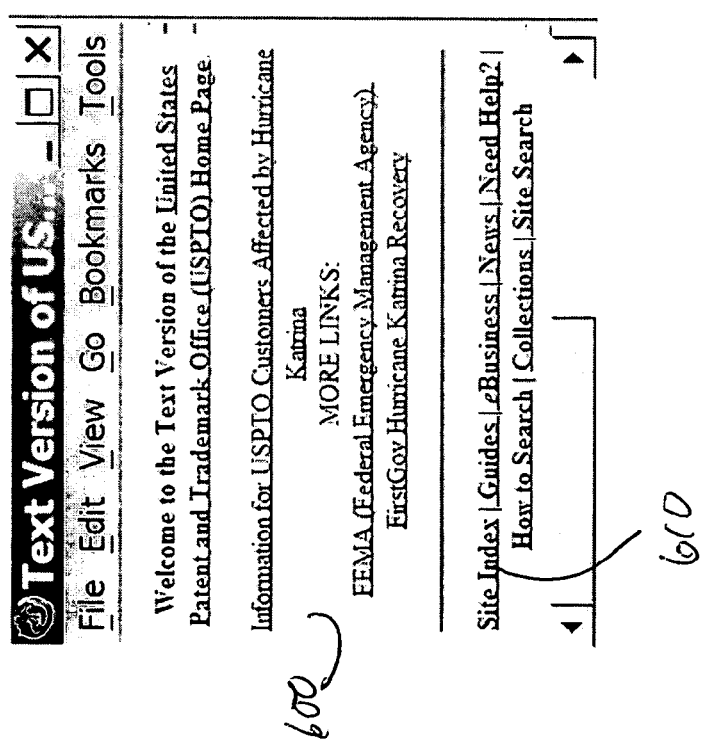
Figure 6C:
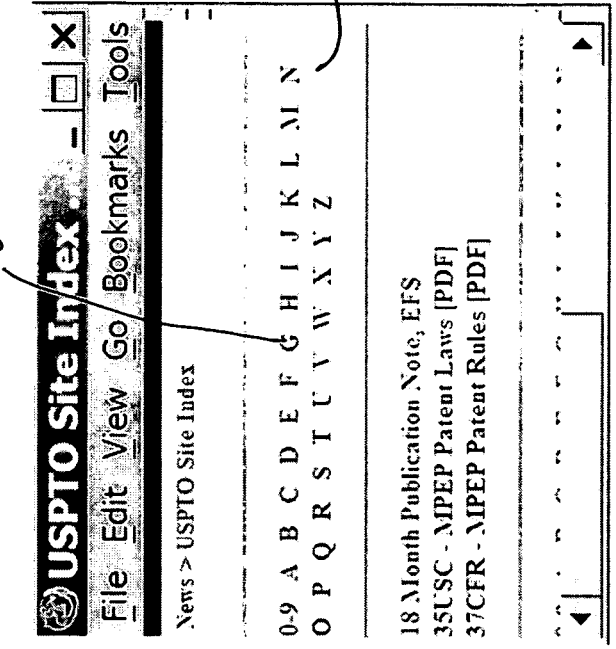
Figure 6D:
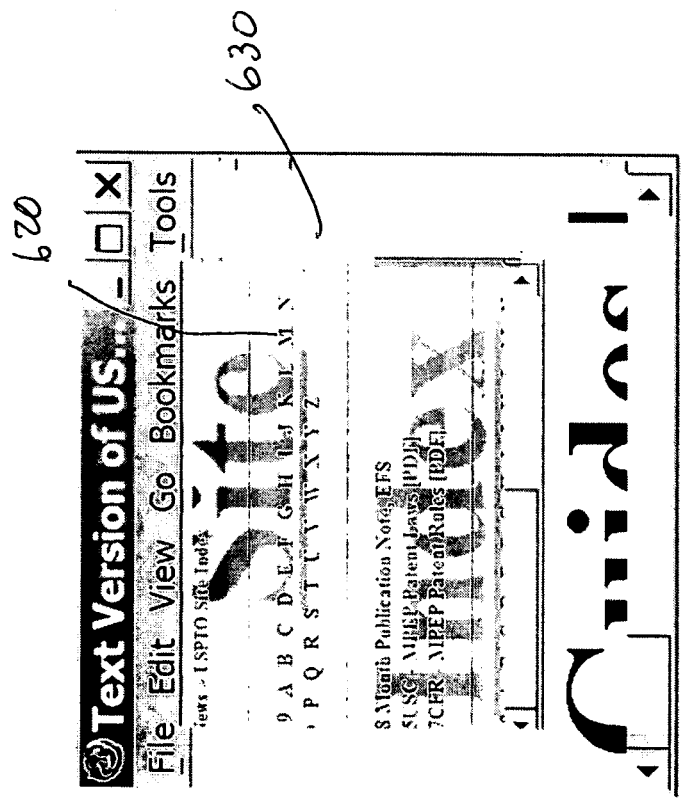
Figure 6F:
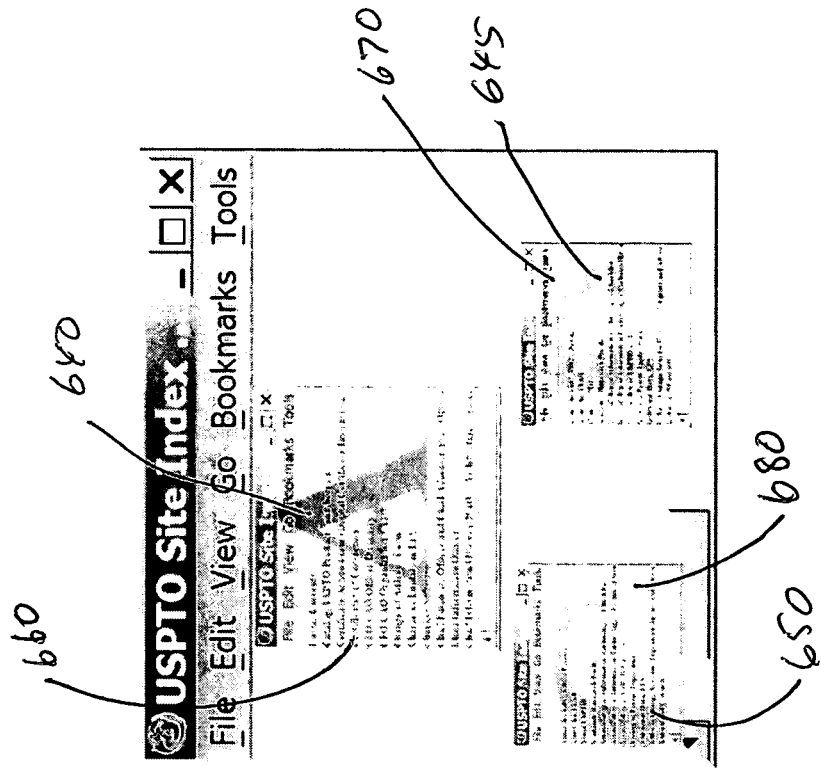
Figure 6E:
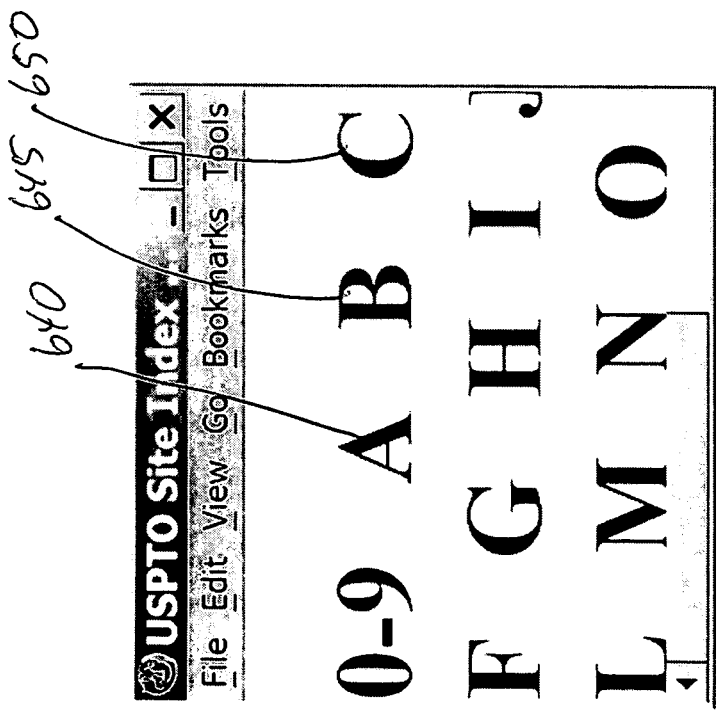

The browsing system of the invention allows a user to zoom in continuously on a link in the top web page and the closer the user zooms in, the more detailed information of the linked page will be shown. For example, as shown in FIGS. 6A-6F, as the link Site Index 610 of the top web page 600 is zoomed in on, detail of the Site Index link 610 become more visible. As shown in FIG. 6C, the content 620 of the Site Index web page 630 is displayed. As zooming continues, the Site Index link 610 disappears as shown in FIG. 6D and the user is now viewing the Site Index web page 630. Continued zooming of the content 620, which include links 640, 645 and 650 as shown in FIG. 6E shows content of links 640, 645 and 650. This content 660 (of link 640), 670 (of link 645), and 680 (of link 650) is shown in FIG. 6F.

When a user wants to view a linked page 630 all the user needs to do is to zoom in to the link 610 of the linked page 630. Of course, all html links contain a description of the linked URL and the underlying URL to the linked web page. While the user zooms in to the link 610, the text will become bigger and bigger as shown in FIG. 6C and FIG. 6E. The system may predict that the user is going to browse to the linked page 630 when a predetermined threshold is reached. The predetermined threshold may include a zoom magnification, zoom factor or other magnitude. Once the predetermined threshold is reached the system starts to connect to the linked web page 630 to download the content 620 of the linked web page 630. Initially, the linked page 630 will occupy the same space in the text description of the link 610. The browser may only display a compressed overview image of the content 620 as shown in FIG. 6C. However, as the user continues to zoom, the linked web page image becomes bigger and bigger, and when the zoom magnitude is large enough, the linked web page 630 will be displayed in a normal font and size in the screen window as shown in FIG. 6D. Now we say that the user has browsed to the linked web page in a first underlying layer.

Once in the first underlying layer, the user can read clearly the text and images of the linked web page 630. It is like the user is now at the microscopic view of the original web page 600. Furthermore, he can scroll up and down, left and right in the in the first underlying layer. When he browses outside the boundary of the original linked web page, he may either see the enlarged contents of the top layer or another linked web page in the first underlying layer linked from the top layer. By the time the user browses to the other linked web page, the other linked web page will automatically be downloaded and the page contents rendered with similar font and size as the original linked web page.

The linked web page 630 in the first underlying layer may contain additional links 640, 645 and 650. Zooming to the link 640 causes the system to display the linked web page 660 in a second underlying layer. A user may navigate to linked web pages in the second underlying layer by navigating up and down and left and right to move beyond linked web page boundaries. In this manner, the user may navigate linked web pages at a plurality of underlying layers without having to go back to a previous back and click on a link to the linked web page by simply zooming and navigating within an underlying layer. For example and with reference to FIG. 6F, a user may navigate from linked web page 660 to linked web page 670 by navigating within the second underlying layer. The user does not have to go back to the first underlying layer to web page 630 to navigate to linked web page 670.

The system of the invention is similar to map browsing. The top layer is like viewing a world map—continents can be seen but country details cannot be seen. When a viewer scales down to a country map, cities and states can be clearly seen. Further scaling down to a city map will show the viewer street details. Further scaling will show houses and lot details. In the browsing method of the invention, the top layer is like the world map and the first underlying layer is like the country map and the second underlying layer is like the city map. In a digital map system, the user is able to scroll up and down at any map level to read or to browse any part of the map at any scale level. In accordance with the invention, a user can navigate linked web sites at any underlying level.

The system of the invention includes the ability to automatically download the contents of the linked web page when the user zooms in on the link. The system may cache the linked web pages in the underlying layer being navigated close to the currently viewed linked web page. The system further keeps track of which underlying layer is being navigated. Furthermore, when the user starts to scroll within the underlying layer, the system will automatically fetch the web pages in the direction of movement. If the linked web pages have not been cached, the system downloads the linked web pages and renders them. This is important to give the user a much smoother view and shorter response time of the web pages close to the current page in the current underlying layer.

This caching mechanism enables the system to detect and predict from the user's navigation movements the items that need to be preloaded or cached before the user needs the items and can greatly increase the performance and response time of the system. This method can not only be applied to web pages in a layer but also to hidden contents of the pages, which include implied interactions between users and web pages. This method allows user access to all contents of the linked pages or frames without the need to click each link. The system will accordingly download or pre-fetch the necessary contents from different links based on the user's mouse or game controller moving directions.

For example, a news site will have a list of web pages sorted by date and time. In the past, the web page could only display a fixed number of items in the list say 50 items and the user would click a NEXT link or button to get the next 50 items of the list and click the PREVIOUS link or button to get the previous 50 items of the list. With the caching mechanism of the invention, the system can automatically fetch, preload or cache the next or previous items according to the user's action. In this example, while the user is moving the mouse upward, the system immediately pre-fetches the previous 50 items and makes them ready to display and if the user moves the mouse downward, the system pre-fetches or caches the next 50 items.

Through this mechanism, the user can continuously browse all items in the list without needing to click. If the use is in the top layer where the links of the list are shown, then the user can browse and see all the links of the web page. If the user navigates to an underlying layer (a details layer) where the exact detail of each item is shown, then the user can browse and read all contents of items in the web page by just scrolling up and down with the mouse without the need to click. The ability to predict the user's browsing intent from control actions (upward, downward, left, right) is the basis for determining which contents to pre-load and cache before the user actually starts to read the contents.

To implement the preload or pre-fetch caching mechanism, either the web page or the browser can implement such functions. The web page can implement such functions by using client side scripts that connects to the server to get the to-be-needed contents by detecting user's actions. The user's actions may be any mouse movements or game controller actions or even keyboard actions such as up, down, left, and right key strokes. On the other hand, this function can be implemented by the browser or browser-plug-in so that any web page to be displayed can have such pre-load functionality.

This process can be repeated indefinitely until at one layer there are no more links or the user quits the program. However, due to the hyperlink nature of such html or web pages, the link depths could be either infinite or recursive.

There are two solutions, one is to stop at a certain link depth or zoom scale. In this solution, when the link depth or zoom scale is reached, the user cannot continue to zoom or scale to view linked web pages. The user either clicks into the web page or goes back to browse previous pages. Another solution is to allow the browser to continue the zooming and scaling process as if there is no end. Eventually this solution may require the browser to use too much memory or disk space. In this case, the browser may discard some top layers in order to free more space.

The browser can save memory and disk space by not rendering or displaying the exact contents for all linked pages in any layer. It only needs to remember all the pages in layers that have been visited and preload those that will be browsed by the user. It uses user actions to predict and determine whether and when to load the pages at any time during the browsing. For example, when a user scrolls up the browser will predict that the user may want to load pages in the same layer that is above the current linked web page. When the user continues to zoom, the browser may follow links under a current viewpoint and load it first even before the contents of links becomes absolutely necessary.

Of course, the download of the to be displayed pages will occur in the background so that the user's main browsing or surfing activities will not be interrupted but the overall browsing experience will be greatly enhanced. This kind of pre-downloading based on user actions could be best used for reading news or other database items for a web server. For example, one news site may archive millions of news items but cannot display them all at once. Traditionally it only displays news by certain ranges and asks users to explicitly click next in order to browse more items. In accordance with the invention, the browser can detect that the user is scrolling down and automatically retrieve the next lists as soon as the user scrolls down. While the user is scrolling down, he can easily browse all the archives in the system. This technique can either be implemented by the browser or by web sites utilizing scripts that detect user actions and automatically download pages to be shown.

If a recursive link is encountered, the browser can either continue to render the linked page (which already occurs in an upper layer) in the current layer or automatically jump back to the upper layer. This is more a user's preference of browsing.

This method of browsing by zooming linked web pages in multiple layers is best suited for reading web pages with many links. For example, some web pages contain headline news with details in links. With this approach, a user just needs to scale down one layer and he can easily browse all detailed news pages since all detailed links now exist in the same layer and there is no need for him to click back and forth. In traditional web browsers, he has to click one link to read one news article, either in the same window or a new window and after reading it he has to go back to the previous link or close the newly opened window. Either way, the user requires many actions to browse the news. In accordance with the browsing method of the invention, the user can just sit and scroll in a scale that covers enough details. It is like seeing newspapers in a very large microfiche film.

Figure 7:
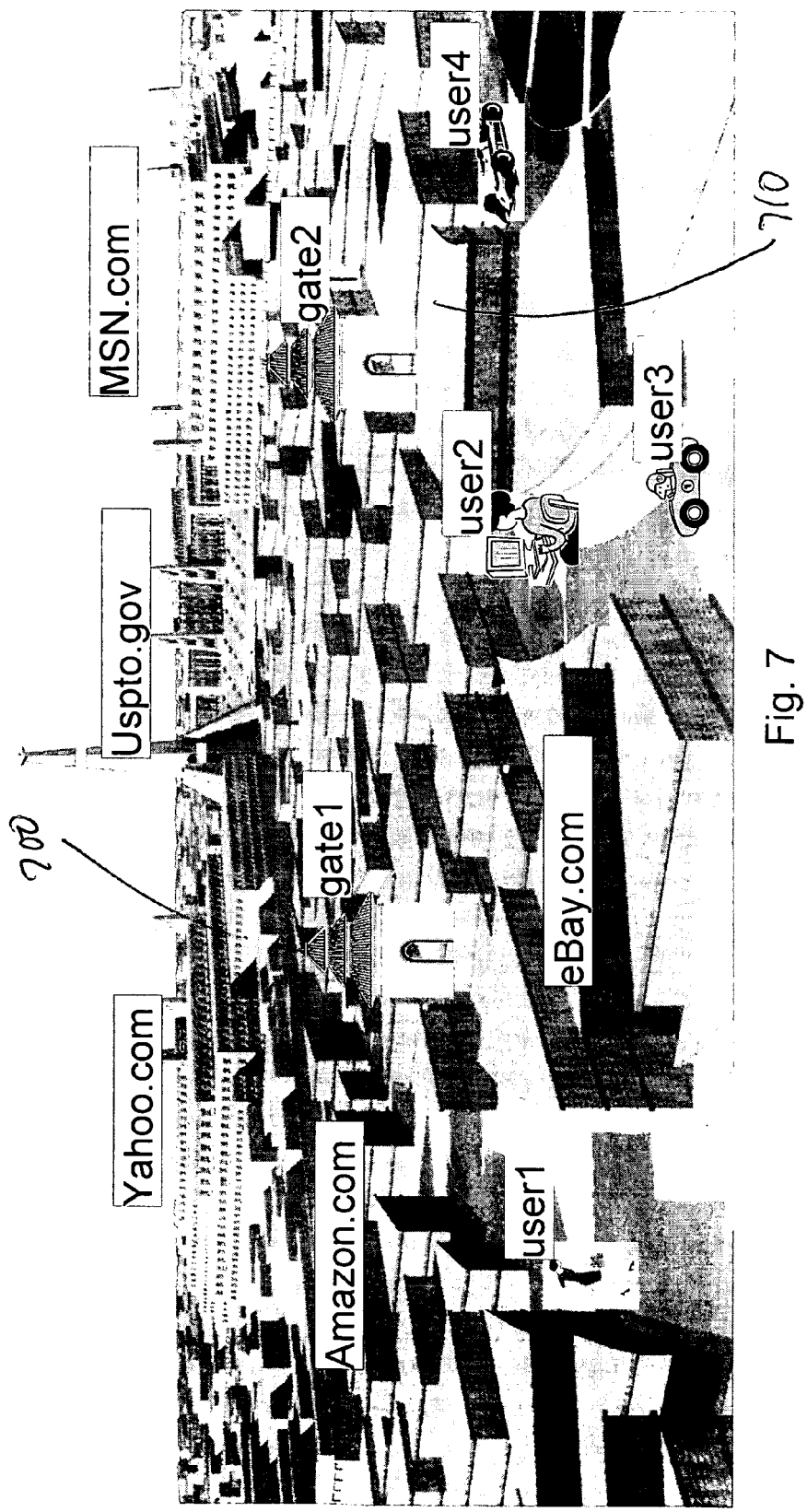
FIG. 7 is a graphical representation showing a plurality of users navigating a virtual 3D space in accordance with the invention.

To further add user interactions among users of the Internet, new functions in the browser may be added that allow users in the Internet to interact with others in the 3D virtual space. In other words, all users who are visiting the Internet will connect to a particular location server that keeps track of where the current users are. And each individual browser will contact the central location server to get the location of users who are also browsing in the 3D virtual space. In this way, surfing the Internet can be seamlessly integrated with playing a virtual 3D game. This is shown in FIG. 7 where user2 and user 4 are visiting the same site 710 in a 3D virtual city 700.

user1 and user 3 are also in the 3D virtual city 700 navigating. user1, user2, user3, user4 may see and interact each other in the 3D virtual city 700.

In order to allow this kind of interactivity between users in the Internet, every time a user browses or surfs in the 3D virtual space, the browser notifies the location server about the location that the user is currently on, most likely, the web site and web pages that the user is currently visiting. In the case where a user can browse multiple web pages in multiple windows, the user may have several clones in the 3D virtual space. When a new user starts to browse the 3D virtual space, the browser will not only show the web sites and web pages in the 3D virtual space, but also the other users that are watching or visiting the 3D virtual space. Each user in the system can have a character or symbol representing the user so from another user's point of view, the user will be seen as moving—walking in the street or flying in space or among planets, in real time.

Two users in the 3D virtual space can meet together and then can also perform actions with each other, such as talking, chatting or sending messages. Now the whole Internet becomes one of the largest online 3D virtual games for users who are browsing the Internet and the 3D browser is acting as an interface between the players. The browser can implement any action or operation in the 3D virtual space like traditional 3D games—for example, two users can combat, kick or kill each other if the browser supports these actions. Actually, the browser can also implement other community games so that users in the Internet can play these social games while they are browsing the Internet.

When one user visits one web site or web page, those who are visiting the same web resource may form a community called a resource-based virtual community as described in my co-pending patent application Ser. No. 10/710,964 filed on Aug. 15, 2004 entitled "Resource Based Virtual Communities", the entire disclosure of which is incorporated herein by reference. This browser and server system can communicate to the community's servers so that members who are viewing the same web page may be able to collaborate. Within the 3D virtual space, more interactions can be achieved among members.

For example, one member can write a comment regarding one web page and post his comments along with that web page in the 3D virtual space and other members can see his comments immediately. Of course this comment will be stored either in the location server or community server so that others can visit and see the information. For example, in the city view of the 3D virtual space, the member can post comments outside the house of the web site so others may know if the web site is worth visiting or not. Also, when the member sees that one web site has many people gathering together he may feel that web site must be a popular web site worth visiting. Also in the city view, when two members met each other in a web page room, the room could become a real chat room for them since they can start chatting or playing games.

During this process, there should be a location server for each view of the Internet 3D virtual space and the coordination for each view must be shared for all users in the Internet. And if a member does not want to be visible in order to protect his privacy, he could do so and others won't see him but he still can see others and start interacting with others.

To implement these kinds of interactions among users on the Internet, there are two approaches. One is to start from an existing virtual 3D game. For example, when there is an existing 3D game that people from all over the world can interact with each other in, the game system can add a module to map all the Internet sites and web pages of this game world using the maps described above. Now the users can watch the Internet web pages and web sites within the virtual 3D game world just as if they are doing other things in the game world. And they can continue their activities in this 3D world as normal. The game system will track all users' positions and interactivities and allow them to interact with each other.

Another approach is to add a new module to existing web browsers so that the browser will show the Internet as a 3D virtual space and allow users to visit the Internet as if roaming inside the 3D space. An additional module or plug-in may track each user's activities and positions and report it to a central server such as a community server based on that resource; or it can report to others through peer to peer communications—which depends upon the implementation. In this manner, all users using this kind of browser or plug-in can communicate and interact with each other as if they are playing a virtual 3D game.

Finally, the 3D virtual spaces also work with real virtual reality if the browser and user's client machine do support virtual reality hardware—in this case, when users are browsing the web, they feel like they are inside the Internet, interact with others as if the user is really inside a virtual world full of web sites, web pages and other people. Also the web sites can be not only web services, but also other online services such as gopher, ftp, or other resources. Correspondingly, web pages can be not only web resources but also any other online resources such as images or any online products. The system and method of the invention may also be used in mobile applications.

I claim:

1. A method of navigating any web resources containing hyperlinks comprising the steps of:
   displaying a current web resource including hyperlinks to at least a separate web page;
   zooming to a selected hyperlink;
   displaying content of the hyperlink to a separate web page in overlaying relationship with content of the current web resource when a first predetermined zoom threshold is reached; and
   switching to display only said separate web pace when a second predetermined zoom threshold is reached.

2. The method of claim 1, wherein the current web page is displayed in a top layer and the content of the hyperlinks to separate web pages is displayed in a first underlying layer.

3. The method of claim 2, wherein contents of all hyperlinks to separate web pages of the current web resource are displayed side by side in the first underlying layer.

4. The method of claim 2, further comprising automatically navigating to an adjacent hyperlink from the current selected hyperlink in the original web page within a same underlying layer when the current selected hyperlink is scrolled out of boundary of display window.

5. The method of claim 4, wherein the content of the adjacent hyperlinks to the current selected hyperlink is pre-fetched.

6. The method of claim 5, further comprising predicting the direction of adjacent hyperlinks based upon user's actions.

7. The method of claim 6, wherein the user's actions comprise from the group consisting of mouse actions and keyboard actions.

8. The method of claim 1, wherein the overlay relationship comprise displaying the content of a hyperlink within the display space of the hyperlink itself.

9. The method of claim 1, further comprising pre-fetching content of the hyperlinks to a separate web page before the first threshold is reached.

10. A system of navigating any web resources containing hyperlinks comprising:
    a navigation tool in a browsing device;
    a navigation tool zooming detecting means; and
    a rendering utility coupled to the zooming detecting means, the rendering utility providing a content of a current web resource that contains at least a hyperlink to a separate web page, the content of the hyperlink to the separate web page being displayed in overlaying relationship with the content of the current web resource when a first predetermined zoom threshold is reached and display only said separate web page when a second zoom threshold is reached.

11. The system of claim 10, wherein the zooming detecting means comprises user action means selected from the group consisting of mouse movement detection means and keyboard actions detection means.

12. The system of claim 10, wherein display in overlaying relationship comprise displaying content of the hyperlink in the same display area of the hyperlink inside the display space of the content of the current web resource.

13. The system of claim 10, wherein the rendering utility switches and displays only content of the hyperlink to a separate web page when the hyperlink is zoomed by the navigation tool and a second predetermined zoom threshold is reached.

14. The system of claim 10, wherein the separate web page comprise links to other hyper linked web resources.

15. The system of claim 10, further comprising a pre-fetching utility operable to pre-fetch content of the adjacent hyperlinks based upon input from the zooming detecting means.

16. The system of claim 15, wherein the input from the zooming detecting means comprises an indication that the navigation tool has moved out of a boundary of the currently displayed hyperlink.

17. The system of claim 10, wherein the rendering utility is operable to create a top layer including a current web resource and underlying layers including hyperlinks to separate web pages, the content of the separate web pages being rendered in the underlying layers.

18. A method of navigating any web resources containing hyperlinks comprising the steps of:
    displaying a current web resource in a top layer;
    detecting a zooming action on a hyper link to a separate web page in the current web resource;
    rendering the content of hyperlink to the separate web page in an underlying layer when a first predetermined threshold is reached, the rendered hyperlink being displayed in overlaying relationship with the current web resource; and
    allowing navigation to and display only said separate web page when a second predetermined threshold is reached.

19. The method of claim 18, wherein displaying in overlaying relationship comprise displaying content of hyperlink in the same space of the hyperlink.

20. The method of claim 18, further comprising: automatically displaying the content of a next adjacent hyperlink while the currently displayed hyperlink content is scrolled out of boundary of the current display window.

* * * * *